July 24, 1951     C. H. SCHOWALTER     2,561,598
METHOD OF GAS ENGINE OPERATION
Original Filed Feb. 23, 1945     2 Sheets-Sheet 1
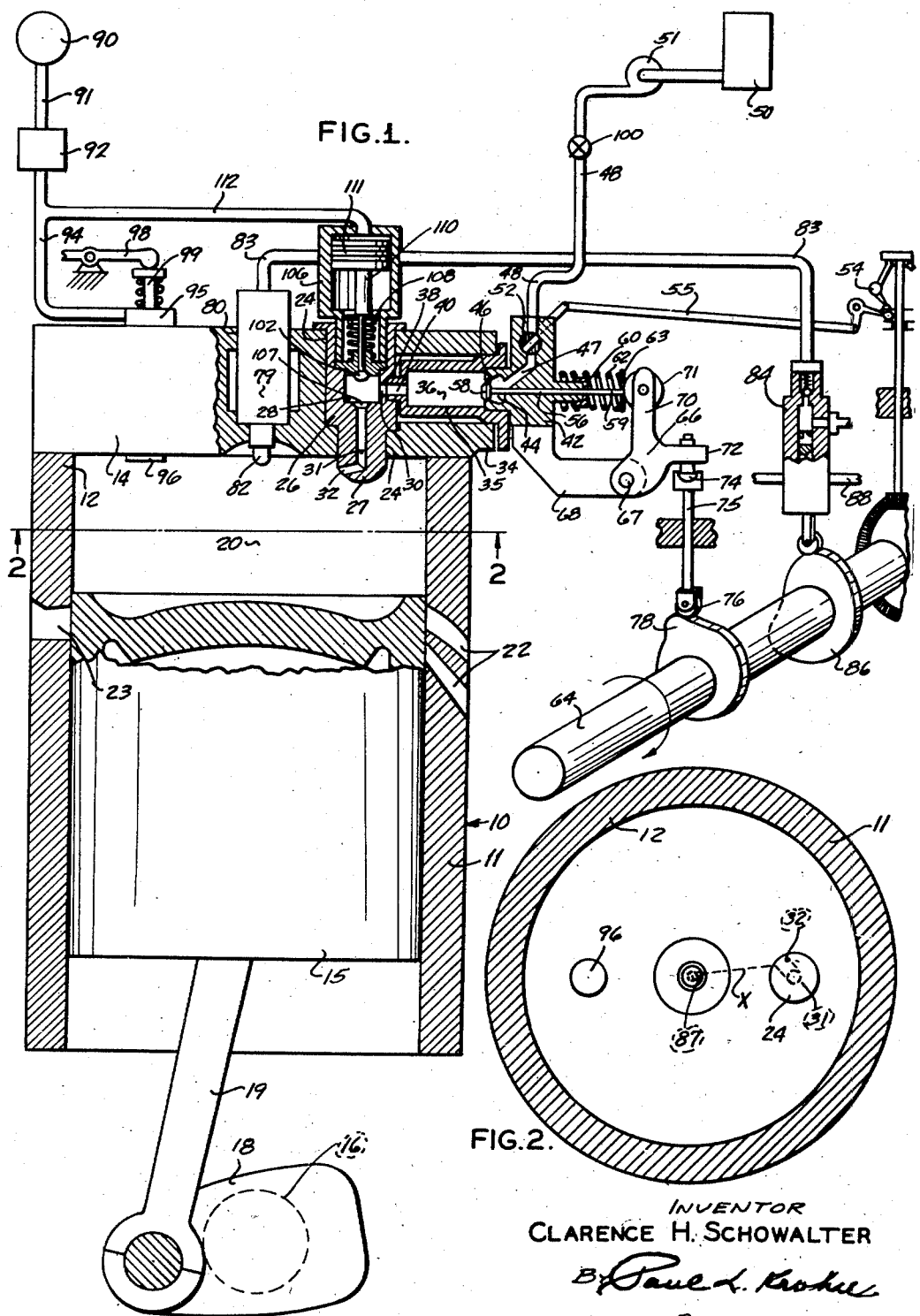
INVENTOR
CLARENCE H. SCHOWALTER
ATTORNEY July 24, 1951  C. H. SCHOWALTER  2,561,598
METHOD OF GAS ENGINE OPERATION
Original Filed Feb. 23, 1945  2 Sheets-Sheet 2

PRESSURE

DEGREES OF CRANK ANGLE

INVENTOR
CLARENCE H. SCHOWALTER
BY Paul L. Krchma
ATTORNEY

Patented July 24, 1951

2,561,598

UNITED STATES PATENT OFFICE 2,561,598

METHOD OF GAS ENGINE OPERATION

Clarence H. Schowalter, Beloit, Wis., assignor to Fairbanks, Morse & Co., Chicago, Ill., a corporation of Illinois Original application February 23, 1945, Serial No. 579,374. Divided and this application July 31, 1946, Serial No. 687,457

7 Claims. (Cl. 123—1)

This invention relates to internal combustion engines, and more particularly to a method of operating an engine of high compression character on a gaseous fuel, the present improvements affording essentially a gas engine operating on the Diesel cycle, and in which combustion of the principal gas fuel charge is initiated in a chamber auxiliary to the cylinder combustion space, with gas ignition effected by liquid fuel such as oil, injected into the cylinder combustion space in small quantity and compression-ignited therein.

This application is a division of my application for improvements in Gas Engines, filed February 23, 1945, and bearing Serial No. 579,374.

In general, it is the purpose of the present invention to provide a method of operating a high compression, oil-ignited gas engine such as to afford distinct improvements in respect to fuel ignition, combustion and operating characteristics, over existing and heretofore prevailing types of oil-ignited gas engines; the present method further affording an operating efficiency and power output approximating such factors in a Diesel engine of comparable size.

Accordingly and objectively to the foregoing, there is provided a high compression gas engine wherein the compression pressure attained is of the order of that normally occurring in a Diesel engine of comparable size, and in which is embodied a gas combustion space auxiliary to the cylinder combustion space and having restricted communication with the latter. In accordance with the presently improved operating method, gaseous fuel supplied under a pressure which is very materially less than the maximum compression pressure attained in the engine, is introduced to the auxiliary combustion space in quantity determined according to engine loading, with admission initiated and completed in a period of relatively low cylinder compression during the compression stroke of the piston. Prior to fuel combustion, the major portion of the gas charge so admitted, is retained in the auxiliary space, and during the compression cycle of the engine, is thoroughly mixed with cylinder combustion air forced into the auxiliary space along with whatever gas may initially attain the cylinder space, to result in a rich gas-air mixture. Combustion ignition of the gas fuel charge as compressed in the auxiliary space, is effected in a positive manner, as by an igniting charge of liquid fuel such as oil, admitted by solid injection directly into the cylinder combustion space, with admission thereof timed to occur near the end of the piston compression stroke, whereby to afford compression-ignition of the oil charge as in the Diesel cycle. It is important to the present improvements as for assuring positive gas ignition while effecting desirable economy of igniting oil consumption, that the quantity of gas-igniting oil so injected, be preferably less than but which may closely approach, that quantity determined to be just sufficient for operating the engine under a no-load or idling condition, when operating on oil alone.

Among the more important advantages afforded by the present improved method of operating a gas engine as above indicated, may be noted the following:

In consequence of retention of the major portion of the gas fuel charge in the auxiliary combustion space during the engine compression stroke and until combustion thereof is initiated in such space, and in further consequence of the restricted communication afforded between the auxiliary space and the cylinder space, combustion detonation is practically eliminated; the cyclic or operating efficiency of the engine is improved principally as a result of the compression of the gas fuel charge in the auxiliary combustion space and the high ignition and burning pressures attained therein, with the latter ultimately reflected in the cylinder space; the provision of a restricted passage between the auxiliary gas-fuel receiving space and the main cylinder space, of a character and trend to cause turbulence in the auxiliary space during compression, so as to assure thorough mixing of the gas and air therein, as well as a desirable turbulence in the cylinder combustion space upon admission thereto of the products of combustion and unburned gas from the auxiliary space, whereby to facilitate as near complete combustion of the fuel as is possible in the combustion cycle, and lastly as here noted, the dangers inherent in supplying gas fuel to the engine under high pressures, as well as any necessity for providing multi-stage gas compressors, both generally prevailing in connection with engines of this general character which require gas fuel admission to the combustion space in a period of high or peak cylinder compression, are now avoided in the presently improved engine, this for the reason that the engine requires only a low pressure gas supply as may be effected by a low pressure, single stage compressor or the like, since the gas fuel is injected in a period of low cylinder compression, as at a preselected time within the period of piston displacement on its compression stroke, from a point prior to piston closure of the cylinder exhaust ports to a point following exhaust port closure thereby.

In the herein disclosed exemplary embodiment of a gas engine operated in accordance with the present improved method of operation, the engine shown is provided with a gas combustion space auxiliary to the cylinder combustion space, a restricted passage between these spaces affording a port-opening to the gas space and having its axis substantially in a plane transversely of the cylinder axis, and a fuel valve of the solid injection type, having discharge orifice means opening to the cylinder space and arranged relative to the port-opening of said passage, such as to direct fuel admitted thereby, toward the port-opening, so that a portion of said fuel may attain and enter the latter to facilitate and promote positive gas-charge ignition in the auxiliary space.

Additional objects and advantages attained by the present invention will appear readily from the following description of the improved operating method as applied to a high compression gas engine in a preferred embodiment thereof as illustrated by the accompanying drawing, wherein:

Fig. 1 is a vertical sectional view of an engine subject to the present improved method of operation and wherein certain parts of the structure and the control elements are shown more or less diagrammatically;

Fig. 2 is a section transversely of the engine cylinder, as taken from line 2—2 in Fig. 1;

Figure 4:
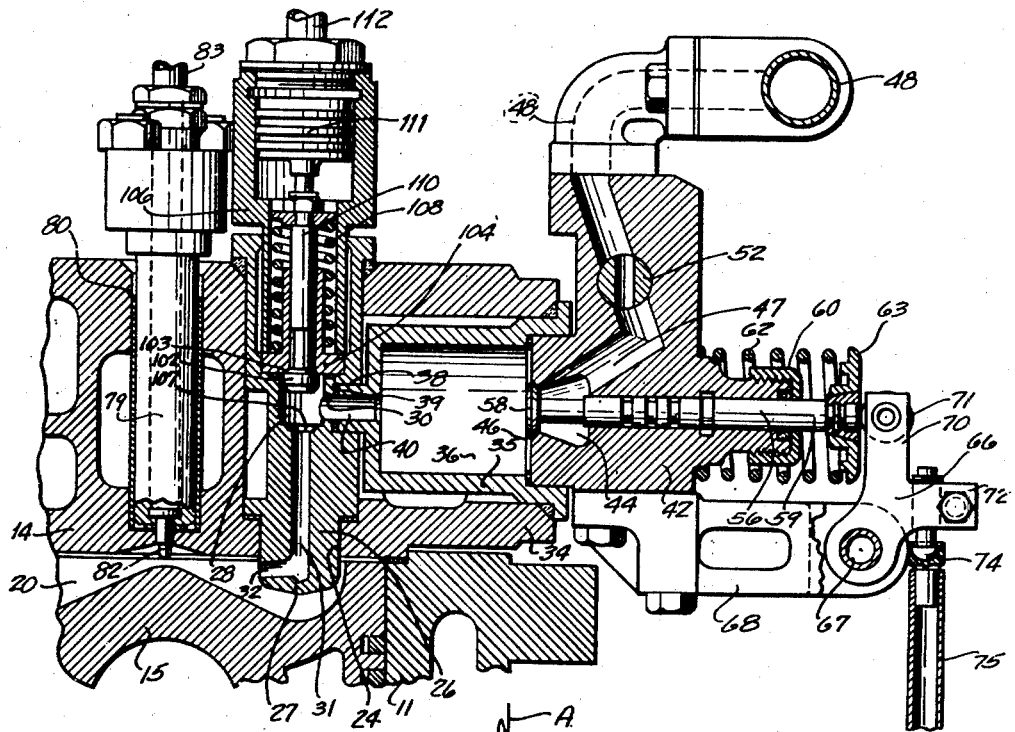
Fig. 4 is an enlarged fragmentary section of the cylinder head structure.

Although the present invention is applicable to single or multi-cylinder engines of either two or four cycle type, having cylinder exhaust and scavenging provisions of any well-known character suitable for use in Diesel engines, it is presently preferred by way of example only, to illustrate and describe the improved operating method as applied to a two-cycle engine embodying cylinder exhaust and scavenging ports controlled by piston displacement.

Referring now to the drawing by appropriate characters of reference, there is illustrated in vertical section according to Fig. 1, a cylinder assembly of a two-cycle high compression gas engine 10. As shown, the parts necessary to present disclosure, include an engine cylinder 11 closed at one end 12 by a cylinder head structure 14 suitably secured thereto, and a piston 15 reciprocable in the cylinder and operatively connected to the engine crankshaft 16 through crank 18 and piston connecting rod 19. The piston head, cylinder and cylinder head cooperate to form a cylinder working or combustion space 20, and arranged in the cylinder walls for communication with the space 20 as effected under control of piston 15, are scavenging air admission ports 22 and exhaust discharge port or ports 23.

The cylinder head 14 which is of jacketed, water-cooled construction, is apertured therethrough, as at 24 in a zone off-set or eccentrically located relative to the cylinder axis, to receive a hollow body member 26 which is suitably removably secured therein so as to have the inner end portion 27 thereof, projecting into the cylinder combustion space 20. Hollow member 26 provides a somewhat central chamber 28, a port passage 30 extending laterally therefrom, and a passage or duct 31 leading from the chamber and extending through the projecting end portion 27 of the member. The latter passage terminates in one or more ports opening to the cylinder space 20, only one port 32 being illustrated herein and shown as having its axis substantially in a plane transversely of the cylinder, the port 32 further by preference, having a slight but perceptible downward inclination as appears in Figs. 1 and 4. Cylinder head 14 further, at one side thereof is inwardly recessed in the zone of a laterally projecting head boss 34, to receive a cylindrical member 35, the interior chamber 36 of which provides a gas fuel combustion space auxiliary to the cylinder space 20, and of a volumetric capacity predetermined for a given engine. Member 35 which thus constitutes a gas combustion cell, is suitably removably secured in the head recess, and provides at its inner end a ported neck 38 in sealed abutment with body member 26 through a gas-tight sealing gasket 39 (see Fig. 4), the neck providing a port-passage 40 in direct communication with port-passage 30 in the body member 26. The outer open end of cylindrical member or gas cell 35, is closed by a valve casing 42 suitably carried by the cylinder head, and is sealed (Fig. 4) at the juncture of the casing and member, as by a gas-tight sealing gasket 43. Within valve casing 42 is a gas chamber 44 terminating in the end of the casing opposed to the chamber 36 of the gas cell 35, in an inlet port 46, and a gas delivery passage 47 opening to the valve gas chamber 44 and connected at its opposite end, to a delivery pipe 48 in the gaseous fuel supply system shown diagrammatically in Fig. 1. As appears, the supply system may include a source 50 of gaseous fuel, as butane or any other gas suitable for engine combustion according to the presently improved method of gas engine operation to be hereinafter described, a gas compressor 51 of a relatively low pressure character, arranged in the supply pipe 48 and regulated to maintain the gaseous fuel under a delivery pressure of not substantially less than 20 pounds, but preferably at some preselected value above 20 pounds, and a valve 52 preferably located in valve casing 42, in the duct 47 thereof, to control the quantity of fuel passing therethrough, as will more fully appear hereinafter. The valve 52 preferably is automatically regulated to control gas fuel delivery in accordance with engine loading, this being effected by an engine speed-responsive governor device 54 of suitable type, having a line or other suitable connection 55 with the valve.

Journalled for reciprocation in the valve casing 42, is a valve stem 56 having at its inner end a valve head 58 in control of valve port 46. The opposite end section 59 of the valve stem 56 is extended beyond the valve casing through a packing gland 60, for operative association with valve actuating means shown somewhat diagrammatically in Fig. 1. A compression spring 62 bearing between the valve casing and a collar 63 on the valve stem section 59, serves to load the valve in the direction to seat valve head 58 at port 46, while valve-opening displacement may be effected in timed relation to the engine operating cycle, from the engine camshaft 64. The latter may be accomplished by suitable mechanism, as a bell-crank 66 pivoted at 67 on a support 68 projecting from the valve casing 42, and having one arm 70 supporting a roller 71 in engagement with the valve stem section 59, and its other arm 72 associated through a ball or spherical joint 74, with a push rod 75 extending to the zone of camshaft 64 for cam-engagement through a roller 76, with the operating cam 78 on the camshaft.

Positive ignition of the gaseous fuel which according to present improvements, is initiated in the gas cell and ultimately completed in the cylinder combustion space 20, is accomplished by a pilot or igniting charge of fuel such as fuel oil, injected directly into the cylinder space 20 through a valve 79 of the solid or air-less injection type and of any well known construction. The injection valve 79 is received through a centrally located cylinder head recess 80, such that the valve tip or discharge nozzle end 82 thereof projects into the cylinder space 20 and preferably in line with the cylinder axis.

A fuel line or conduit 83 conducts fuel oil under pressure from an engine fuel pump 84 operated by cam 86 on camshaft 64, to the injection valve, the amount of oil injected and the timing of injection following predetermined conditions presently to appear.

Describing now the method of gas engine operation afforded by the present improvements, in normal running, the cam 78 in its function to open the gas valve 58, is so positioned with respect to piston travel, as to lift the push rod 75 and hence through the bell-crank 66, open the gas valve 58, on the upstroke or compression stroke of the piston 15 and at a time early in such displacement of the piston, when the pressure of air compression in cylinder space 20 and the resultant lesser compression in cell 35, are relatively low. In the present embodiment, cam-opening of valve 58 to admit gaseous fuel is by preference, determined to occur at about the time of piston closure of the cylinder exhaust and scavenging air ports, as at a time before or following port-closure thereby, when the air pressure then determined in cell 35 is appreciably less than the selected admission pressure of the gaseous fuel entering the cell. The admission pressure of the gaseous fuel is as before noted, maintained by compressor 51 at a desired value preferably above 20 pounds, the exact pressure however being predetermined for a given engine, to assure positive gas delivery into cell 35 against the increasing but lesser pressure of the air under compression in the cell during the gas injection period.

An important feature to be noted in the present improvements, is the location of the gas inlet valve 58 relative to the cell 35 such that it delivers the gaseous fuel to the cell at a point therein most remote from the cylinder combustion space 20. Thus the gas entering at the outer end of the cell, will be retained therein in greater part, as a result of the combustion air under increasing compression pressures, incoming from the cylinder space 20. However, while the air pressure in the cell is yet below the gas admission pressure during the initial phase of the piston compression stroke, some small portion of the gas upon admission to the cell, may at times pass through the restricted passage between the cell and cylinder space 20, and into the latter. Nevertheless, as combustion air pressures increase in the cylinder space during the later stages of piston compression displacement, some or even the greater part of the gas initially escaping into space 20, will be forced back into cell 35 along with combustion air. Hence, as maximum relative compression pressures are approached in cylinder space 20 and cell 35 upon the approach of the piston to its top center position, a very substantial part or nearly all of the gas charge admitted, will be found in the cell. By reason of the relatively tortuous or angulate trend of the restricted communication between the cell and cylinder space 20, provided by the passage 31, port 32, chamber 28, and passages 30 and 40, the air forced into the cell during piston compression, will enter the same in a turbulent condition, which thereby facilitates thorough mixing of the gaseous fuel with the combustion air. Under the high compression pressure obtaining in the engine cylinder space 20 and reflected in somewhat lagging degree in the cell 35, as of the order of compression pressures prevalent in Diesel engines, a very considerable volume of combustion air will be highly compressed in the cell, to result in a suitable gas-air charge therein. According to present improvements however, as maximum compression is approached in cylinder space 20 and at the time of pilot fuel injection to the latter, the resultant compression pressure of the gas mixture in cell 35 is less than the cylinder pressure, this by reason of the constricted passage afforded between the cylinder and cell which imposes a definite time lag in the compression build-up in the cell under the influence of cylinder compression. Moreover, the degree of passage constriction and timing of pilot fuel injection are determined in relation to the self-ignition characteristics of the gaseous fuel utilized, such that the gas-air mixture under compression in the cell at the time of pilot fuel injection, will be then appreciably below the self-ignition temperature of the mixture. Consequently and of great importance to the present system, ignition of the gas mixture in cell 35 is thus determined and controlled in a positive manner, by the pilot or gas igniting fuel charge.

It is to be noted here that in the cam-actuation of gas valve 58, the duration of opening thereof relative to piston travel, as may be determined by proper proportioning of the high or actuating portion of the cam 78 and with regard to the speed of camshaft rotation relative to crankshaft speed, is relatively short, being sufficient only for admitting the predetermined necessary volume of gaseous fuel for each cylinder firing cycle. Closure of valve 58 thus is timed to occur preferably before the compression pressure in the cell 35 equals the gas inlet pressure, so that the gas volume required may be admitted in the open period of the valve. The amount or volume admitted is, however, variable within limits through the engine governor controlled gas or throttle valve 52, in order to maintain the engine speed relatively constant under varying engine loading. The valve 52 in this instance, is regulated responsively to the engine speed responsive governor 54, to permit a greater or lesser volume of gas flow into cell 35 through valve 58, in the relatively short open period of the latter.

Combustion of the gas charge is initiated by the pilot fuel oil charge admitted to the cylinder space 20 by the injection valve 79 and ignited by the heat of cylinder compression. As shown by Fig. 2, the port 32 in the communicating passage between the cell 35 and cylinder space 20, has its axis substantially in a transverse plane of the cylinder (Fig. 1), and is directed inwardly of the cylinder at a substantial angle, as of the order of 45 degrees, to a diameter of the cylinder intersecting the axis of vertical passage 31. One purpose for so directing the port 32 will appear presently. Cooperating with the port is a discharge passage or nozzle opening 87 (Fig. 2) in the injection valve tip 82 (the opening 87 may be one of several provided in the valve tip, if it be desired to have more than one), the passage 87 being formed to discharge the pilot or igniting fuel oil preferably in the form of a spray, and being directed downwardly so as to discharge the pilot oil spray toward the port 32, as indicated by the broken line X in Fig. 2. The fuel pump 84 provided for delivering fuel oil under pressure in pipe or conduit 83, to the injection valve 79, may be of a variable delivery, constant stroke plunger type well known in the art, and is here regulated as by the usual pump out-put regulating mechanism provided therein and controlled through a so-called pump rack control indicated at 88, to deliver in each ignition period, a quantity of fuel oil less than but approaching that which would be required to operate the engine under idling or no-load conditions, on the Diesel cycle with the compression-ignited oil alone. The metered oil charge from the pump is, of course, delivered to the injection valve 79 and causes valve-opening to inject the fuel into cylinder space 20. Since the principal function of the pilot oil charge is to produce ignition of the gas charge, the limitation in the quantity utilized to no more than is necessary to effect a positive gas ignition, as the quantity indicated, affords a material saving of fuel oil, as the latter is usually more expensive than the gaseous fuels suitable for combustion in the engine. Further, the operation of the fuel pump 84 supplying fuel oil to valve 79, is so timed relative to the compression stroke of the engine piston 15, as to deliver fuel oil to the valve 79 for injection thereby into cylinder space 20, as the piston 15 approaches dead center position at the end of its compression stroke. By preference although it may be otherwise, the timing of pilot injection is such that it takes place within the period represented by crank travel between 30 degrees and 10 degrees before top dead center positioning of the piston thereby, and may be set within this range, or if preferred at some point beyond the range given, as by proper positioning of the pump cam 86 relative to piston travel.

Upon injection of the igniting charge of fuel oil, the injected spray as directed toward the open end of the port 32 (Fig. 2), is ignited in cylinder space 20 by the heat of cylinder compression. Actually, some of the oil spray may enter the passage 31 through port 32, and become ignited therein. However, by reason of the pilot fuel injection toward the port 32, flame ignition will occur in the zone of the port and passage 31, and by reason of the pressure differential then existing between the cylinder and cell, there will then result very probably a flow of burning oil and other matter into the passage 31 toward the cell 35. Probably at some point in the passages or in the region of the chamber 28 and passage 40, the burning oil will cause ignition of the gas charge. Because of the restricted communications between the cell chamber and cylinder space 20, afforded by the passages 31, 32, 30, 40 and the chamber 28, combustion of the major portion of the gas charge is confined in its initial stages at least, to the cell space 36. But as the combustion pressure rises sharply in the cell, the burning gas charge will expand outwardly through the communicating passageway, into the cylinder combustion space 20, with combustion completed in the latter during the power stroke of the piston 15. A feature facilitating effective and complete combustion in the cylinder space 20, is found in the directioning of the port-passage 32 through which the burning gas charge issues into the cylinder space. The port-passage 32 given the trend heretofore described, as substantially horizontally and inwardly of the cylinder space, at an angle to the cylinder diameter intersecting the axis of passage 31, thus serves to direct the issuing charge substantially across the cylinder along a chord thereof, so as to produce a swirling or turbulent expansion of the burning gas therein, to result in a more complete commingling of gas charge and the combustion air in the cylinder. As a consequence, more complete combustion is attained.

Figure 3:
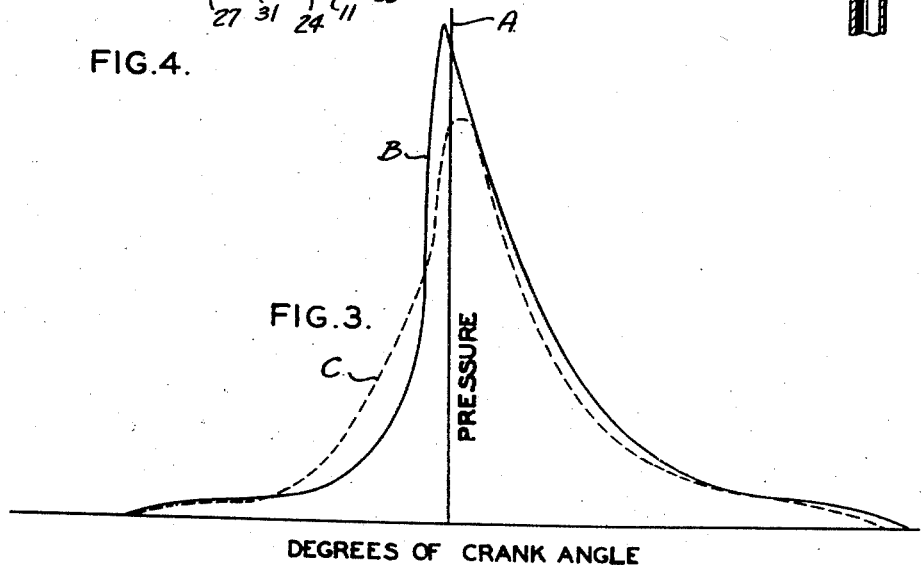
Fig. 3 illustrates by appropriate curves, the relative pressures obtaining in the cylinder combustion space and auxiliary or gas cell space.

As indicative of the relative combustion pressures obtaining in the cell 35 and the cylinder combustion space 20 in each combustion cycle, reference is made to the pressure curves of Fig. 3, taken from an engine constructed and operated according to the present improvements. As there shown and considered with reference to the top dead center position of the piston, as represented by the vertical reference A, the curve B (in solid line) represents the pressure-variations obtaining in the cell 35, and curve C (broken line) the same with respect to the cylinder space 20. It will be noted that the cell pressure is less than the cylinder space pressure, during piston compression displacement up to the point of pilot fuel ignition to produce ignition of the gas charge in the cell. Thereafter, combustion of the gas charge confined initially to the cell, causes a very sharp pressure rise in the cell, to a peak pressure which may obtain at a point in the engine cycle prior to the piston attaining top dead center. The cylinder pressure also rises sharply in this phase, but to a materially lesser extent as shown by curve C, and passes more gradually through a peak occurring preferably after top center of the piston.

In consequence of the foregoing described method of operating the gas engine, combustion detonation in the cylinder is eliminated, this resulting in major part, from the initial combustion of the gas charge in the cell 35 rather than in the cylinder space 20, and further, because of the restricted communication between the cell and cylinder chamber, which serves to retard the ultimate expansion of the burning fuel into the latter. Moreover, since a major portion of the gas charge is retained and highly compressed in the cell 35, and because the peak burning pressure occurs in the cell, to aid the expansion of the burning charge into the cylinder space 20 on the piston power stroke, the operation of the engine is improved. Accordingly, the present improvements afford a gas engine operating under high compression, with gaseous fuel admission under relatively low inlet pressure, and attaining an operating efficiency and power output characteristic of a Diesel engine of comparable size.

Starting of the engine may be accomplished in any suitable manner, as by compressed air in an air start system well known in Diesel engine starting practice. Such a system is preferred for the presently improved gas engine, and is shown in part and diagrammatically in Fig. 1, as including a source 90 of compressed air connected by pipe 91 to a starting control or valve device 92, and air delivery pipe 94 leading from control 92 to valve casing 95 of a cylinder air valve 96 controlling cylinder starting air delivery to cylinder space 20. Air valve 96 may be actuated by the engine, as from camshaft 64, through suitable operating connections (not shown) to a tappet lever shown only in part at 98, bearing upon the valve stem 99 of valve 96. Thus through proper timing of valve actuation by tappet lever 98, starting air is admitted to the engine cylinder at correct times in the starting cycle. During starting, delivery of gaseous fuel to the cell 35 is prevented by suitable means as a shut-off valve 100 in gas line 48, while the pilot injection of fuel oil somewhat increased in quantity of injection at this time, is permitted to occur to assist engine starting through combustion thereof in the cylinder. However, since it is difficult to start a cold engine of the character described, due in part to the chilling effects of the cylinder and cell walls, the starting provisions here include means for reducing the total effective combustion space of the engine by temporarily shutting-off or isolating the auxiliary or cell space 36 and preferably, a portion of the passageway between the cell and cylinder space 20, this being effected only at starting and so as to effect an increase in the maximum compression obtaining in the cylinder space 20, on the piston compression stroke. With increased compression and to assure engine starting and to facilitate quick engine warm-up before the changeover from starting to normal running on the gaseous fuel, the quantity of fuel oil injected during the starting cycle, may be increased through output regulation of the fuel oil pump 84, as by proper adjustment attained through the pump rack control 88. The increase in quantity of oil injected may be and is by preference, limited to not materially more than that quantity which is determined for a given engine, to be sufficient to start the engine and continue warm-up operation thereof.

The means here provided for isolating the cell space 36 from the cylinder space 20 at starting, is found in a valve element 102 normally disposed in a valve seat 103 formed in the end 104 of a valve casing 106 mounted in the body member 26. The end 104 of valve casing 106 defines one wall of the chamber 28 in the restricted passageway between the cell and the cylinder, and is located to dispose the valve 102 for displacement across chamber 28 and into seating relation with valve seat 107, formed at the opening of passage 31 into chamber 28. Thus when valve 102 is seated on valve seat 107, it effectively closes passage 31 to chamber 28, and hence isolates not only chamber 28, but the cell 35 from the cylinder space 20.

Valve 102 during normal operating of the engine and at all times except during engine starting and warm-up, is retained against seat 103 by a valve spring 108, but at starting, is positioned against seat 107. The latter disposition of the valve is accomplished automatically in the present example, in direct response to the functioning of the starting air system. To this end, the valve stem 110 is connected to a piston 111 slidable in valve casing 106 and actuated against spring 108, by the starting air pressure conducted to the valve casing above the piston, by a conduit 112 leading from the air supply conduit 94. Thus the starting air pressure is applied to the piston, whereby to displace the same and the valve 102, in the direction to seat valve 102, such as to close passage 31, and hence isolate cell 35 from the engine cylinder. Following engine starting and warm-up, the air pressure acting on piston 111 is released through the control device 92, to permit spring 108 to return the piston and valve 102 to inactive positions, whereupon normal gas operation with pilot fuel ignition may be established as herein described.

Having now fully described the invention, the improved method of engine operation is claimed as follows:

1. The method of operating an internal combustion engine having a combustion space auxiliary to the cylinder working space, which consists in introducing a gaseous fuel to the auxiliary combustion space early in the compression cycle and in quantity determined according to engine loading, in highly compressing a major portion of the gaseous fuel with combustion air in the auxiliary space, and in admitting by solid injection, liquid fuel in small quantity to the cylinder working space in a period of high cylinder compression, for compression-ignition therein to ignite the compressed gaseous fuel and air in the auxiliary combustion space.

2. The method of operating an internal combustion engine having a combustion space auxiliary to the cylinder working space, which consists in admitting a gaseous fuel to the auxiliary combustion space in a period of low cylinder compression, in regulating the quantity of gaseous fuel admitted in accordance with engine loading, in retaining and compressing with combustion air in the auxiliary space, the major portion of the gaseous fuel so admitted, in igniting the compressed gaseous fuel and air in the auxiliary combustion space by liquid fuel injected into the cylinder working space in a period of high cylinder compression, and in maintaining the quantity of liquid fuel injected substantially constant under all engine loads and in an amount less than sufficient to operate the engine under a no-load condition, on the liquid fuel alone.

3. The method of operating an internal combustion engine embodying a combustion space auxiliary to the cylinder working space and having cylinder exhaust and scavenging air ports controlled by the piston, which consists in admitting a gaseous fuel to the auxiliary combustion space in a zone thereof remote from the cylinder working space, with gaseous fuel admission in quantity determined according to engine loading, in initiating gas fuel admission early in the compression cycle, compressing the gaseous fuel with combustion air in the auxiliary space, and in igniting the compressed fuel and air by liquid fuel injected in small quantity into the cylinder working space and compression-ignited therein.

4. The method of operating an internal combustion engine embodying a combustion space auxiliary to the cylinder working space and having cylinder exhaust and scavenging air ports controlled by the piston, which consists in admitting a gaseous fuel to the auxiliary combustion space in quantity determined according to engine loading, in initiating gas fuel admission substantially in the period of exhaust and scavenging port closure by the piston on its compression stroke, in highly compressing the gaseous fuel and combustion air in the auxiliary space, in igniting the compressed fuel and air by liquid fuel injected into the cylinder working space and compression-ignited therein, and in maintaining the quantity of liquid fuel injected relatively constant for all engine loads and in an amount no greater than that necessary to operate the engine at no load, on the liquid fuel alone.

5. The method of operating an internal combustion engine having a combustion space auxiliary to the cylinder working space and providing cylinder exhaust and scavenging air ports controlled by the piston, which consists in admitting to the auxiliary combustion space in a zone thereof remote from the cylinder working space, a gaseous fuel in quantity determined in accordance with engine loading, in initiating and completing gaseous fuel admission in a period of relatively low cylinder compression, as in the period of exhaust and scavenging port closure by the piston on its compression stroke, in highly compressing the gaseous fuel and combustion air in the auxiliary space, in igniting the compressed gaseous fuel and air by liquid fuel introduced by solid injection into the cylinder working space and compression-ignited therein, and in maintaining the quantity of liquid fuel injected substantially constant under all engine loads and in an amount less than that sufficient for operating the engine at no load on the liquid fuel alone.

6. The method of operatig a high compression gas engine providing a combustion space auxiliary to, and in restricted communication with, the cylinder working space, which comprises supplying to an auxiliary combustion space in a zone thereof remote from the cylinder working space, a gaseous fuel in quantity varying with engine loading, compressing the gaseous fuel with air in the auxiliary combustion space, and in igniting the compressed fuel and air mixture in the auxiliary space before the auto-ignition pressure and temperature of the mixture is reached, by fuel oil injected into the cylinder working space and compression-ignited therein, the amount of fuel oil injected being substantially constant at all engine loads and less than but approaching that sufficient to operate the engine at no load, on the fuel oil alone.

7. The method of operating a high compression gas engine provided with a combustion space auxiliary to, and in restricted communication with, the cylinder working space, which comprises admitting to the auxiliary combustion space in a zone thereof remote from the cylinder working space, a gaseous fuel in quantity varying with engine loading, in initiating and terminating gaseous fuel admission in a period of low cylinder compression, compressing the gaseous fuel and air mixture in the auxiliary combustion space, igniting the compressed fuel and air mixture in the auxiliary space before the auto-ignition pressure and temperature of the mixture is reached, by fuel oil injected into the cylinder working space and compression-ignited therein, and in controlling fuel oil injection such that the quantity injected is constant for all engine loads and less than but approaching that sufficient to operate the engine at no load, on the fuel oil alone.

CLARENCE H. SCHOWALTER.

REFERENCES CITED

The following references are of record in the file of this patent:

UNITED STATES PATENTS

| Number | Name | Date |
| --- | --- | --- |
| 673,160 | Diesel | Apr. 30, 1901 |
| 2,067,461 | Ramsey | Jan. 12, 1937 |

FOREIGN PATENTS

| Number | Country | Date |
| --- | --- | --- |
| 280,239 | Great Britain | Mar. 1, 1928 |
| 407,694 | Great Britain | Mar. 12, 1934 |

OTHER REFERENCES

"Oil Engine," October 1941, pages 148–150.
Gas and Oil Power, April 1943, pages 89–90.
Oil Engine, December 1941, pages 199–201.